US009165272B1

(12) United States Patent
Brown et al.

(10) Patent No.: US 9,165,272 B1
(45) Date of Patent: Oct. 20, 2015

(54) SYSTEM FOR MONITORING A PLURALITY OF TAGGED ASSETS ON AN OFFSHORE ASSET

(71) Applicant: UTEC SURVEY, INC., Houston, TX (US)

(72) Inventors: Douglas John Brown, Livingston (GB); Gregory Hammond, Livingston (GB); David Patrick Cahill, Livingston (GB)

(73) Assignee: UTEC SURVEY, INC., Houston, TX (US)

( * ) Notice: Subject to any disclaimer, the term of this patent is extended or adjusted under 35 U.S.C. 154(b) by 0 days.

(21) Appl. No.: 14/601,489

(22) Filed: Jan. 21, 2015

Related U.S. Application Data

(60) Provisional application No. 61/929,827, filed on Jan. 21, 2014.

(51) Int. Cl.
*G06Q 10/06* (2012.01)

(52) U.S. Cl.
CPC .................................. *G06Q 10/063* (2013.01)

(58) Field of Classification Search
CPC ..... E21B 47/122; E21B 47/12; G01V 11/002; G06Q 10/08; G06Q 10/063
USPC ............ 340/500, 531, 539.1, 539.11, 539.13, 340/853.1–870.44
See application file for complete search history.

(56) References Cited

U.S. PATENT DOCUMENTS

| | | | | |
|---|---|---|---|---|
| 2002/0099456 | A1* | 7/2002 | McLean | G06F 9/4443 700/83 |
| 2005/0132305 | A1* | 6/2005 | Guichard | G06F 17/30899 715/855 |
| 2010/0114493 | A1* | 5/2010 | Vestal | E21B 44/00 702/9 |

* cited by examiner

*Primary Examiner* — James Yang
(74) *Attorney, Agent, or Firm* — Buskop Law Group, PC; Wendy Buskop

(57) ABSTRACT

A system for monitoring a plurality of tagged assets on at least one offshore asset, by creating a customer profile and a library of survey set ups and storing information from independent survey set ups mounted on or proximate to the offshore asset on the administrative data storage. The system includes creating a library of tagged assets for the offshore asset using at least one independent survey set up, wherein each tagged asset has an icon with a hyperlink to a library of images. The system includes identifying placement locations on offshore assets and forming an executive dashboard for display on at least one client device, wherein a virtually positioned icon positioned on an image of the tagged assets presents a hyperlink to the library of survey set ups for that tagged asset, thereby enabling toggling from the image to the library of survey set ups.

22 Claims, 9 Drawing Sheets

FIGURE 2B

| | |
|---|---|
| COMPUTER INSTRUCTIONS TO MOVE THROUGH THE IMAGE FROM AN INDEPENDENT SURVEY SET UP ON THE EXECUTIVE DASHBOARD IN 360 DEGREES IN A VERTICAL PLANE OF THE OFFSHORE ASSET LOCAL COORDINATE NETWORK OF ASSETS OR THE LOCAL GRID USING AN UP BUTTON AND A DOWN BUTTON | 219 |
| COMPUTER INSTRUCTIONS FOR INSTALLING SHOW HIDE ICONS ONTO AN IMAGE FROM AN INDEPENDENT SURVEY SETUP ON THE EXECUTIVE DASHBOARD WHEN A SHOW HIDE BUTTON IS ACTUATED | 220 |
| COMPUTER INSTRUCTIONS TO ADD AND DELETE A TAGGED ASSET TO THE LIBRARY OF TAGGED ASSETS USING A CLIENT DEVICE USING A DIALOG SCREEN TO INSERT OR DELETE: AN ASSET NAME, AN ASSET GEOLOCATION, AND ASSET SPECIFICATIONS WHEN AN ADD OR DELETE BUTTON IS ACTUATED | 222 |
| COMPUTER INSTRUCTIONS TO SEARCH FOR A TAGGED ASSET FROM THE LIBRARY OF TAGGED ASSETS USING AN ASSET NAME OR AN ASSET GEOLOCATION AND PRESENT THE RESULTS OF THE SEARCH ON THE EXECUTIVE DASHBOARD | 224 |
| COMPUTER INSTRUCTIONS TO ADD A COMPASS TO IMAGES FROM THE LIBRARY OF TAGGED ASSETS FOR DISPLAY ON THE EXECUTIVE DASHBOARD WHILE DEPICTING THE LOCAL COORDINATE NETWORK OF ASSETS OR THE LOCAL GRID, WHEREIN THE COMPASS IS ALIGNED TO A TRUE NORTH RELATIVE TO THE TAGGED ASSET ON THE PLANET | 226 |
| COMPUTER INSTRUCTIONS TO PRESENT A LASER ANALYSIS BUTTON ON THE EXECUTIVE DASHBOARD CONNECTED TO LASER ANALYSIS SOFTWARE IN THE ADMINISTRATIVE DATA STORAGE | 228 |
| LASER ANALYSIS SOFTWARE | 230 |
| COMPUTER INSTRUCTIONS TO ENABLE A USER ON A CLIENT DEVICE TO TOGGLE BETWEEN A FULL SCREEN AND A REDUCED SCREEN VIEW OF A TAGGED ASSET, WHEN A FULL SCREEN/REDUCED SCREEN TOGGLE BUTTON IS ACTUATED ON THE EXECUTIVE DASHBOARD | 232 |
| COMPUTER INSTRUCTIONS TO ENABLE A USER TO TOGGLE BETWEEN A FULL COLOR IMAGE FROM AN INDEPENDENT SURVEY SETUP AND A MONOCHROME IMAGE FROM AN INDEPENDENT SURVEY SET UP WHEN A COLOR/MONOCHROME TOGGLE BUTTON IS ACTUATED | 236 |
| COMPUTER INSTRUCTIONS THAT SUPPLIES LOCATION INFORMATION FROM A LOCAL COORDINATE NETWORK OF ASSETS OR THE LOCAL GRID OF TAGGED ASSETS AND IDENTIFIES AT LEAST ONEGEOGRAPHICALLY PROXIMATE INDEPENDENT SURVEY SET UP LOCATION IN THE LOCAL COORDINATE NETWORK OF ASSETS OR LOCAL GRID WHEN AN INFORMATION BUTTON IS ACTUATED ON THE EXECUTIVE DASHBOARD | 240 |
| COMPUTER INSTRUCTIONS TO DISPLAY A MAP OF THE LOCAL COORDINATE NETWORK OF ASSETS OR THE LOCAL GRID WHILE SIMULTANEOUSLY VIEWING IMAGES FROM THE INDEPENDENT SURVEY SET UP WHEN A TAB ON THE EXECUTIVE DASHBOARD IS ACTIVATED | 244 |
| COMPUTER INSTRUCTIONS TO CREATE A PLAN VIEW OF ALL OR A PORTION OF THE INDEPENDENT SURVEY SET UPS FROM THE LIBRARY OF SURVEY SET UPS ON THE EXECUTIVE DASHBOARD | 245 |
| COMPUTER INSTRUCTIONS FOR INDICATING A DIRECTION OF A FIELD OF REFERENCE RELATIVE TO A NORTH OF THE OFFSHORE ASSET ON THE PLAN VIEW IN THE OFFSHORE ASSET LOCAL ZONE SYSTEM OR THE LOCAL GRID FROM AN INDEPENDENT SURVEY SET UP USING A FIELD OF VIEW REFERENCE POINTER IN THE PLAN VIEW CREATED WHEN A TAB IS ACTUATED ON THE EXECUTIVE DASHBOARD | 246 |

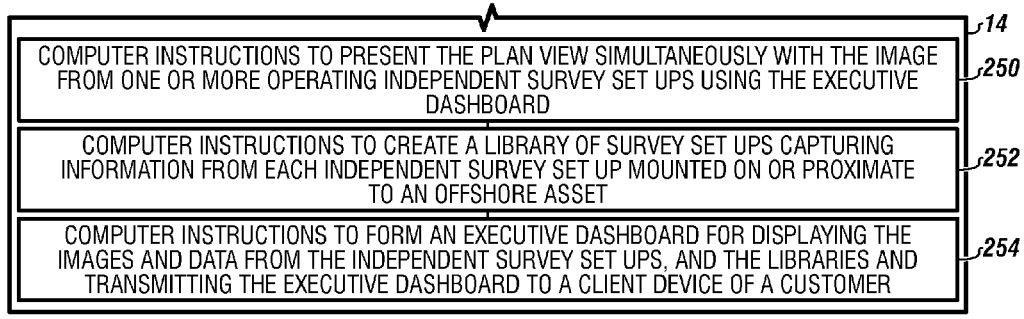
*FIGURE 2C*
*FIGURE 3*
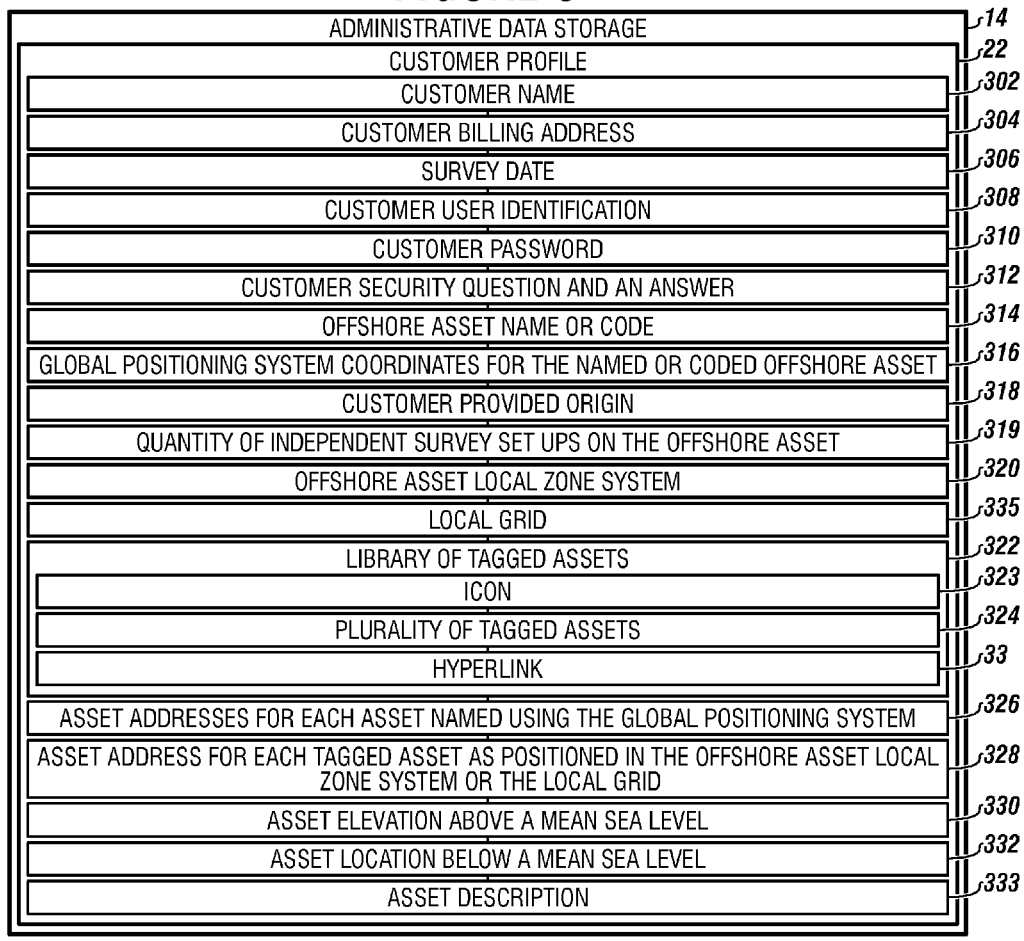

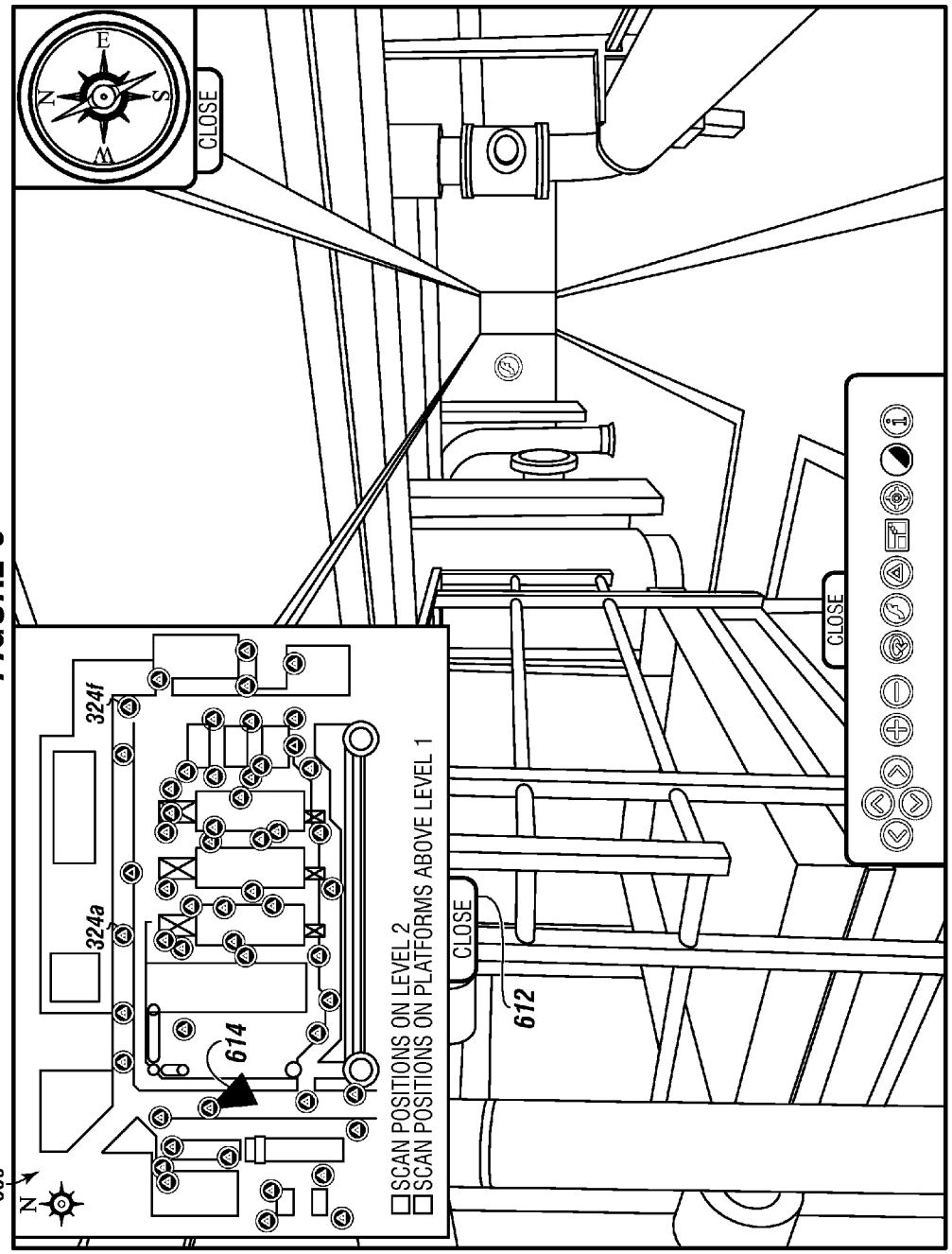

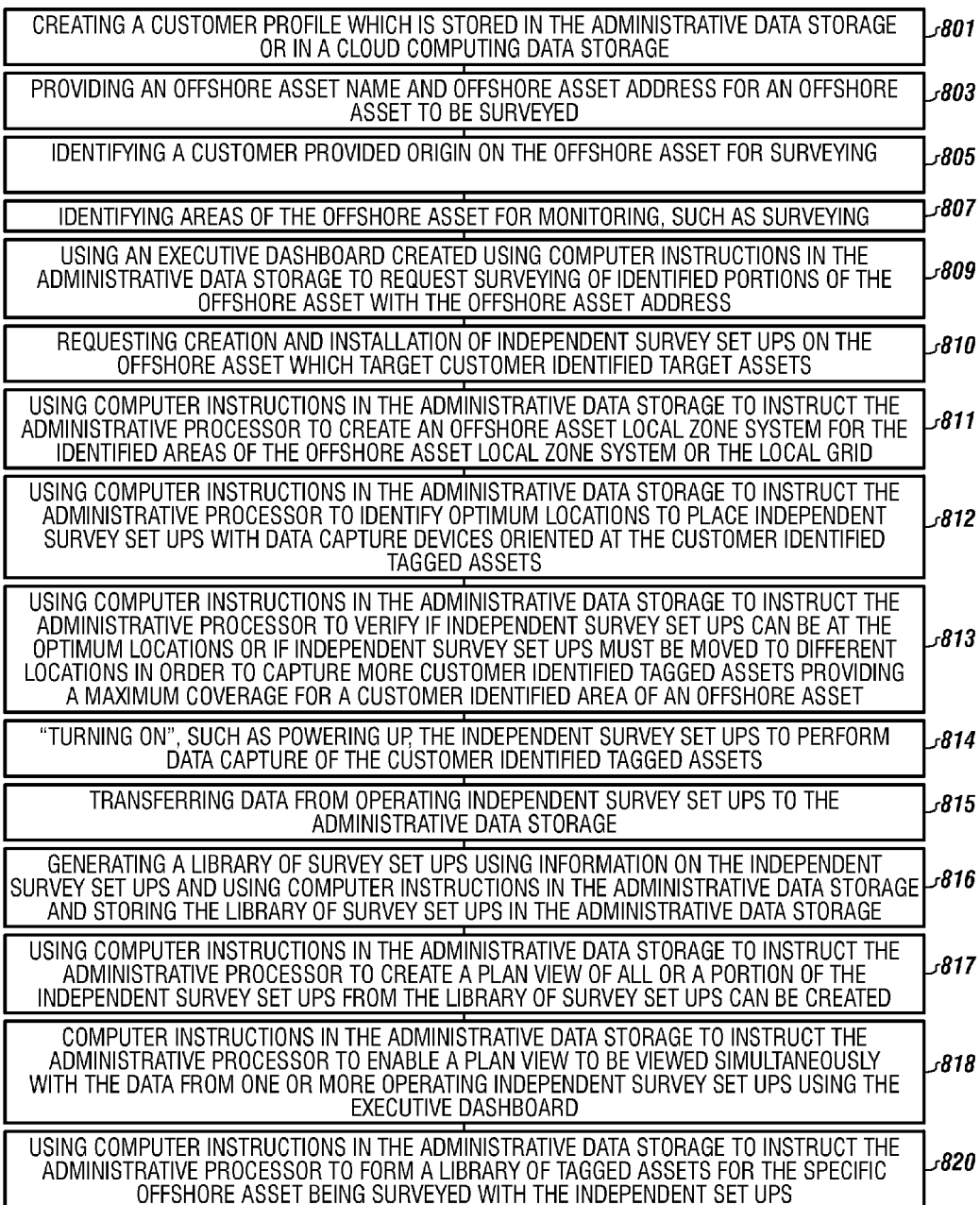

(7A)

| 821 | CREATING AN ICON CONNECTED TO THE LIBRARY OF TAGGED ASSETS AND INSTALLING THE ICON VIRTUALLY OVER THE IMAGE OF THE TAGGED ASSET GENERATED FROM THE DATA CAPTURE DEVICE, WHICH CAN ALSO INCLUDE CREATING A HYPERLINK FOR THE ICON TO THE LIBRARY OF IMAGES AND THE CUSTOMER PROFILE IN THE ADMINISTRATIVE DATA STORAGE |

| 824 | USING COMPUTER INSTRUCTIONS AND THE EXECUTIVE DASHBOARD TO ACCESS AND VIEW RELATED DATA OF THE OFFSHORE ASSETS SUCH AS SPECIFICATION DATA, WHILE VIEWING THE DATA CAPTURE IMAGES AND THE PLAN VIEW SIMULTANEOUSLY FROM A PLURALITY OF CLIENT DEVICES OF THE CUSTOMER, SIMULTANEOUSLY |

*FIGURE 7B*

SYSTEM FOR MONITORING A PLURALITY OF TAGGED ASSETS ON AN OFFSHORE ASSET

CROSS REFERENCE TO RELATED APPLICATIONS

The current application claims priority to and the benefit of U.S. Provisional Patent Application Ser. No. 61/929,827 filed on Jan. 21, 2014, entitled "SYSTEM FOR MONITORING A PLURALITY OF TAGGED ASSETS ON AN OFFSHORE ASSET." This reference is hereby incorporated in its entirety.

FIELD

The present embodiments generally relate to a system for monitoring a plurality of tagged assets on at least one offshore asset.

BACKGROUND

A need exists for a monitoring system for specific assets on an offshore asset which uses laser scanning, video collection and other tools, including sonar in real time, and presents the images and related data to a user with a client device that is remote of the offshore asset or on the offshore asset.

The present embodiments meet these needs.

BRIEF DESCRIPTION OF THE DRAWINGS

The detailed description will be better understood in conjunction with the accompanying drawings as follows:

FIGS. 2A-2C depict an administrative data storage usable with the system.

FIG. 3 depicts a customer profile usable with the system.

FIG. 6 depicts a plan view of locations of survey set ups produced by this system.

FIGS. 7A-7B depict a sequence of steps to implement the system according to one or more embodiments.

Figure 1:
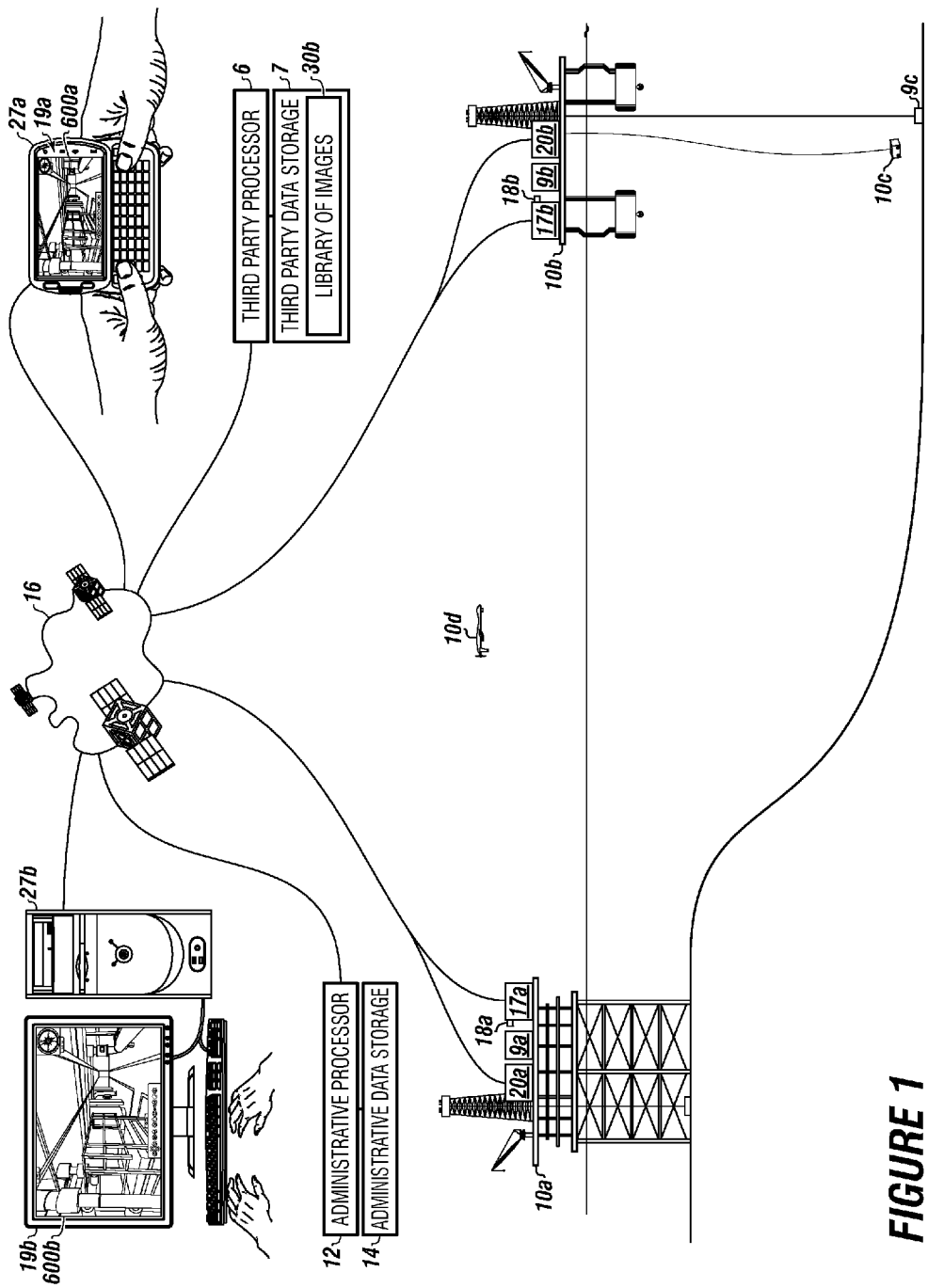
FIG. 1 depicts a diagram of equipment usable with the system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a system for monitoring a plurality of tagged assets on at least offshore assets.

The system can use a networked administrative processor and data storage, and independent survey set ups directed to a tagged asset of an offshore asset.

The system can use a global positioning system differential receiver/transmitter or a local grid.

The system creates a customer profile, and a library of tagged assets connected to an icon with a hyperlink and connected to a library of images of the tagged asset.

The system uses each independent survey set up mounted on or proximate to the offshore asset.

The system forms an executive dashboard receiving images and information from (i) each independent survey set up and (ii) the library of survey set ups and displays a customer name or an offshore asset identifier on an image of the tagged asset and shows the icon virtually positioned on the tagged asset, enabling a customer using the executive dashboard to toggle from the image to the library of survey set ups The system helps prevent the death of a worker by providing status of the offshore asset by means of providing a visual image of the work environment and contributing to safe and effective workplace.

The system helps prevent injuries by visualizing and identifying hazards to workers in advance of work being carried out on the offshore asset.

The system helps prevent injuries by visually identifying trip hazards and undertaking suitable risk assessments in advance of future work being carried out on the offshore asset.

The system helps prevent explosions and fires by identifying areas of highest risk ahead of any maintenance work being carried out.

The system helps prevent environmental harm by providing early detection of exigent hazards that can lead to an environmental disaster.

The following definitions are used herein:

The term "administrative processor" as used herein can refer to a computer, a laptop, a personal digital assistant, a cellular telephone, a tablet computer or similar device capable of processing digital data and presenting digital images. The term can include a plurality of computers connected together, such as cloud computing processing.

The term "administrative data storage" as used herein can refer to a hard drive, cloud based data storage devices connected in parallel or in series, a jump drive, a portable hard drive or combinations thereof.

The term "data capture devices" as used herein can refer to cameras that record video images or sensors that detect temperature and pressure. Data capture devices can include underwater cameras, which can be video or still, and/or laser survey instruments. Data capture devices can include portable laser scanners that can be hand held. Data capture device can be positioned topside and underwater. Data capture devices can include sonar devices. Data capture devices can be mounted to tethered or untethered remotely operated vehicles (ROVs). Data capture devices can be mounted to unmanned aerial vehicles, such as drones, or boats. Data capture device can be mounted to an autonomous underwater vehicle. Often the data capture devices can be mounted on tripods.

The term "client device" as used herein can refer to a laptop, a computer, a cellular telephone, a digital personal assistant, a tablet computer, and combinations thereof that can receive the images of multiple independent survey set ups on the display of the client device.

The term "customer profile" as used herein can refer to a customer name, a customer billing address, a survey date, a customer user identification, a customer password, a customer security question and an answer, an offshore asset name, global positioning system coordinates for the named or coded offshore asset, asset address in the offshore asset local zone system, including a height above or below a water line, and asset specification. Each customer profile can have a library of tagged assets which can include specifications on the tagged assets. The library of tagged assets for each customer identifies each tagged asset on the offshore asset to be used in an offshore asset local zone system. The customer profile can include addresses and identifications of each independent survey set up. Each customer profile can have a link enabling a user to connect to the actual independent survey set ups via a network to view images remotely, such as on client devices like a laptop or cellular phone. Each link can enable a customer to view the tagged assets using each independent survey set up in real time, as well as view historic recorded images. Each customer profile can contain information downloaded from each independent survey set up processor and independent survey set up data storage on equipment specifications of the independent survey set up, maintenance records of the independent survey set ups as well as recorded images.

The term "customer provided origin" as used herein can refer to a customer identified "zero," such as a well location, or "well number 1" as a reference point on or proximate to the offshore asset, which can be a drilling platform. The customer provided origin can include a "local grid" as the term is defined herein.

The term "global positioning system differential receiver/transmitter" as used herein can refer to a global positioning system device which identifies the location of the offshore asset on the planet with WGS-84 coordinates, which can be transformed to a local coordinate system with longitude and latitude coordinates or xy coordinates. In embodiments, the global positioning system differential receiver/transmitter can be used to identify the location of each tagged asset on the planet and be used to identify each independent survey set up on the offshore asset on the planet.

The term "hyperlink" as used herein can refer to data that the customer or user can directly follow either by clicking on or by hovering over using a mouse or other indicator, and which then is followed automatically to another document in another data storage or in an electronic library at another location. A hyperlink can point to a whole document or to a specific element within a document.

The term "independent survey set ups" as used herein can refer to an assembly of connected equipment including a data capture device with a survey set up processor with bidirectional communication, connectable with a power supply, which can be rechargeable batteries or vessel power, data storage connected to the survey set up data storage which provides temporary or portable memory storage of images from the data capture device as well as data including GPS coordinates, actual proximate equipment names, height from decks and ceiling, camera specifications including lenses, and age and model of cameras. Each independent survey set up in embodiments can communicate with another independent survey set up as well as a network to communicate with the administrative processor of the system. The independent survey set up might include information on mounting means, such as tripods, clamps, watertight underwater housings. In some embodiments, the independent survey set up can include additional lighting systems connected to the survey set up processor or the data capture device or both. The survey set up processor can store in the survey set up data storage information on the lighting such as lumens, watts, and type of light, such as "flash halogen", strobe or steady LED (light emitting diode) lights. In some embodiments, which the independent survey set ups can be mounted outside on a semisubmersible or jack up platform, the survey set up data storage can include information on protective housings, and dates of repair or inspection of the housing or entire independent survey set up as well as maintenance information on the independent survey set up. The independent survey set up processor can be a computer or device similar to the administrative processor. The independent survey set up data storage and all data storages in this application are non-transitory computer readable mediums.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The term "laser analysis software" as used herein can refer to commercially available software that allows a customer using the executive dashboard to perform real time measurements of the tagged asset with the data capture device from the executive dashboard. Commercially available laser analysis software can be purchased from Leica Geosystems of the United Kingdom.

The term "library of tagged assets" as used herein can refer to a customer defined set of tagged assets on the specific offshore asset. Each customer profile can have a library of tagged assets. Tagged assets can be valves, meter, pumps, gauges, switches, and/or pipes or any other tagged asset on the offshore asset. In the library of tagged assets, each tagged asset can have a specification, which can include a manufacturing date of the tagged asset, a maintenance schedule or schedule of repairs or inspections, and known defects. Each tagged asset can have additional information related to start date and end dates of maintenances for tracking service to the tagged asset. In the library of tagged assets, each tagged asset can have an installation date. Each tagged asset can have a priority code, showing the importance of the tagged asset on the offshore asset. Some tagged assets are critical to operation of a drilling rig and have a high priority; other tagged assets, such as running the toilets of the crew accommodation, can have a lower priority. The library of tagged assets can be customized to particular user needs, and can include information such as manufacturing materials of tagged asset, color of the tagged asset, size, weight, and anticipated length of usable operation.

The term "library of images" as used herein can refer to images, drawings, figures, manufacturing information including dates of install, dates of manufacture, maintenance records and other text, which can include specifications on tagged assets which can be used on the offshore asset. The library of images can be digital, analog or video images. Sonar read outs can also be in the library of images for underwater assets in particular. CAD drawings can be in the library of images. 3D simulations can be in the library of images as well as animations.

The term "library of survey set ups" as used herein can include information that comes directly from or relates to one or a plurality of independent survey set ups: (i) equipment specifications on data capture devices used in independent survey set ups, such as a camera make, model, and specifications; (ii) an address of the independent survey set up in a local zone system or a local grid; (iii) a live video feed, a stored video feed, or still photos of the tagged assets and can include sonar; (iv) laser information on lasers used in independent survey set ups; (v) semi-temporary targets identified for establishing the location of the tagged asset in the offshore asset local zone system; (vi) at least two and possibly three x, y, and z coordinates locating the independent survey set up in the offshore asset local zone system; (vii) support device information on equipment used to support the data capture device, such as a camera, a laser or both at a preferred height, an elevation above a mean water level, such as a tripod; (viii) a distance from the offshore asset; (ix) sources of power supply for each independent survey set up on the offshore asset, such as oil rig or vessel supplied power, batteries, or a fuel cell; (x) an indication of how the digital transfer of data occurs from the independent survey set ups to the administrative data storage; (xi) survey set up identifiers; (xii) data capture device codes; (xiii) transmission connection descriptions; (xiii) information on a timeline of the data capture device; (xiv) a job project name; (xv) a customer name or a customer code; and (xvi) an offshore asset name or code.

The term "local grid" as used herein can refer to a customer defined location system developed for a specific offshore asset. The local grid identifies using a geolocation system for tagged assets specifically by at least one of: a height, an angle, or a distance to certain markers, monuments, or identified positions indicated by the customer on the offshore asset. In embodiments, the system ties the independent survey set ups to the local grid system and then connects the grid to the network enabling independent survey set ups to be trackable along with tagged assets using a customer's local grid of the offshore asset.

The term "network" as used herein can refer to a cellular network, the internet, another global communication system, a local area network, a wide area network, a satellite network, or combinations thereof. The network can be a client's own private network or a third party cloud network.

As the term is used herein, "offshore assets" can refer to a fixed or floating vessel, or an underwater structure. The offshore asset can be a drilling rig, a semisubmersible a tension leg platform, a floating production and storage vessel, a floating storage unit, a platform, or underwater equipment connected to the offshore asset, such as an remotely operated vehicle (ROV) viewing an open hole section of a subsea well or a manifold, or a plan pipeline.

The term "offshore asset local zone system" as used herein can refer to a local zone system created for identified assets on the offshore asset using a customer provided origin which has a linear dimension. The offshore asset local zone system can be a survey of the entire structure or a portion of the structure.

The term "real time" as used herein can refer to the most recent captured data from a data set or from an independent survey set up. The invention allows multiple customers to view in real time simultaneously captured data from multiple data capture devices on the offshore asset. Real time refers to an ability to display the captured data 24 hours a day, 7 days a week, continuously.

The term "tagged asset" as used herein can refer to an underwater asset, such as a wellhead, a manifold, a pipeline, and ends of pipelines. An underwater tagged asset can be a jacket and a pipeline riser or similar underwater assets. The term "tagged asset" also can refer to above water assets, including but not limited to meters, pumps, gauges and mechanical devices including pipes, and other structural elements on the offshore asset. A tagged asset can be a moored platform, a moored boat, and/or a moored barge.

The embodiments relate to a system for monitoring tagged assets on offshore assets using a processor, data storage and network to connect to a plurality of client devices. The systems use a plurality of independent survey set ups and computer instructions to form an offshore asset local zone system using a customer provided origin.

The system can create a library of tagged assets, can use a library of images, and can create a library of survey set ups of independent survey set ups, to survey the offshore asset.

The system can target customer identified tagged assets within the surveyed offshore asset for monitoring in real time and for monitoring from remote locations by one or more users of client devices connected to the network.

The system can use computer instructions to create an offshore asset local zone system, to place or move independent survey set ups to target tagged assets of the offshore asset.

The system can collect and transfer data from the independent survey set ups and forms a viewable image of the tagged assets, and create a viewable local coordinate network of assets which can be seen on an executive dashboard.

Turning now to the Figures, FIG. 1 depicts equipment used by the system for monitoring a plurality of tagged assets 9a-9c associated with at least one offshore asset 10a-10d.

The plurality of tagged assets can be pumps, meters gauges, or other assets on the offshore asset, which can be generally fixed to the offshore asset in embodiments.

Offshore asset 10a is depicted as a drilling platform. Offshore asset 10b is shown as a floating vessel. Offshore asset 10c is shown as a remotely controlled vehicle looking at a tagged asset 9c, shown as a subsea well. Offshore asset 10d is shown as an unmanned aerial vehicle. Autonomous underwater vehicles can be one of the offshore assets.

In an embodiment, the system can be used to monitor tagged assets on one level of a drilling semisubmersible in the North Sea.

The equipment of the system can include an administrative processor 12 with administrative data storage 14. The administrative processor in embodiments can be a computer located remote from the offshore asset. The administrative processor can be a computer with a data storage which can be hard drives, supplemented portable data storage, or a jump drive.

The administrative processor 12 can be connected to a network 16 which can connect to the offshore asset. In embodiments, two or more networks can be used, such as a satellite network connecting to the oil rig and the internet connected to the administrative processor.

The system uses a plurality of independent survey set ups 17a and 17b with each independent survey set up having one or more data capture devices 18a and 18b. The independent survey set ups with data capture devices can be mounted to the offshore assets and connected to the network.

The data capture devices can connect directly or be in communication to a local area network on the offshore asset, such as a local area network on a drilling rig which in turn connects to a satellite network.

Global positioning system differential receiver/transmitters 20a and 20b on the offshore asset can communicate to the administrative processor through the network 16, enabling the system to correctly locate the offshore asset.

Client devices 27a and 27b can be connected to or in communication with the network 16. The client devices can each have a processor, data storage and a display 19a and 19b which can show executive dashboards 600a and 600b.

A third party processor 6 can be connected to or in communication with the network 16. The third party processor 6 can communicate with a third party data storage 7, which can contain a library of images 30b, which can be accessed by the administrative processor for use in the system.

Figure 2A:
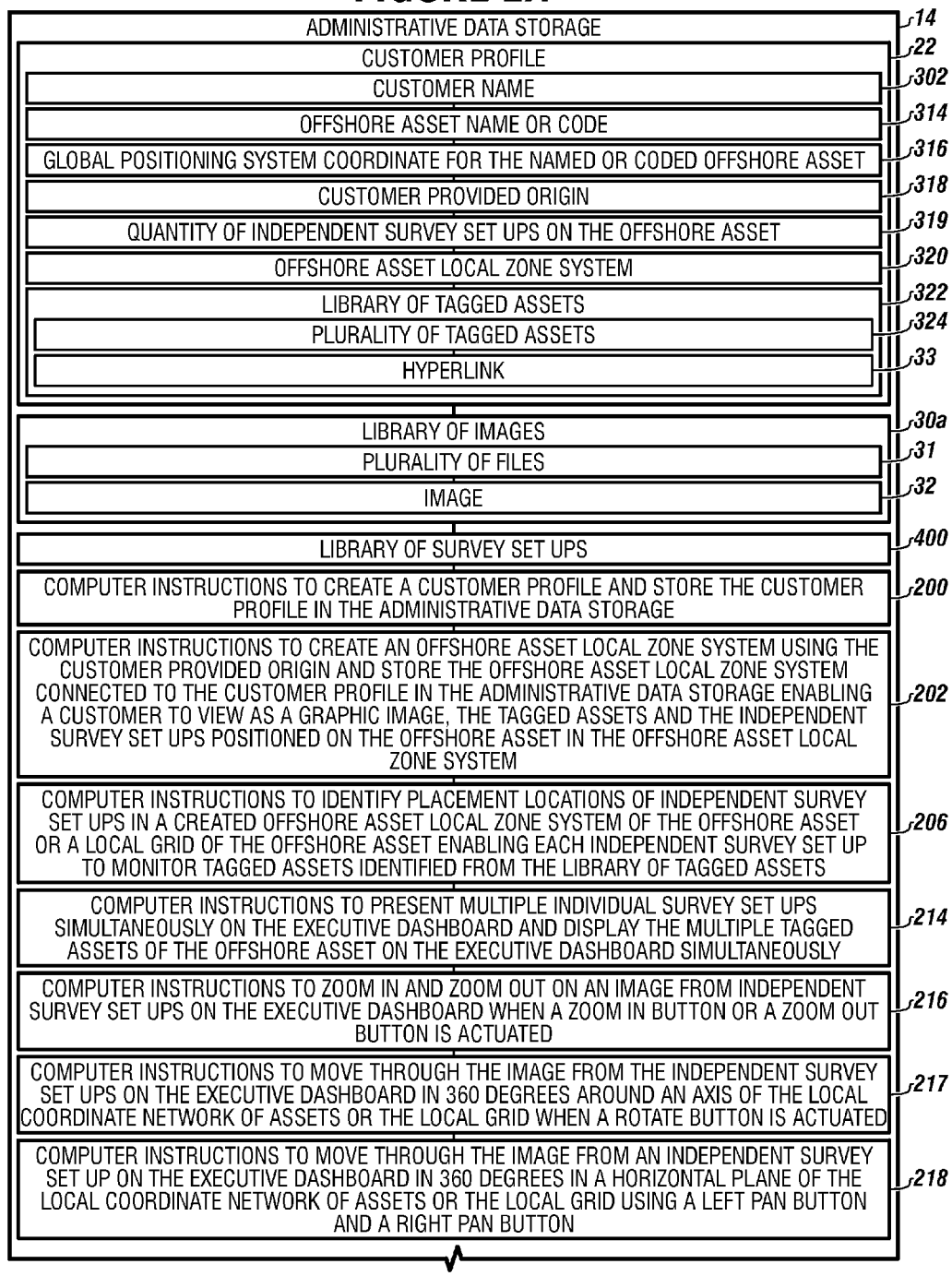

FIGS. 2A-2C depict a diagram of the administrative data storage usable in this system.

The administrative data storage 14 can include a customer profile 22 formed by this system.

The customer profile 22 can include a customer name 302, an offshore asset name or code 314, a global positioning system coordinate for the named or coded offshore asset 316, a customer provided origin 318, a quantity of independent survey set ups on the offshore asset 319, an offshore asset local zone system 320, and a library of tagged assets 322.

The library of tagged assets 322 can be formed by this system. The library of tagged assets can be stored in each customer profile according to the system. The library of tagged assets can include for each tagged asset of the plurality of tagged assets 324, such as a tagged asset name. Each tagged asset can have a hyperlink 33 to at least one of the plurality of files or images in a library of images in the administrative data storage or a library of images in the third party data storage connected to the third party processor in communication with the network.

For example, a hyperlink can be www.use.utec.com/libraryofsurveyset_ups/Shell/bullwinkle.

The administrative data storage can include a library of images 30a containing a plurality of files 31 or images, each file can contain information on the tagged assets in general, such as manufacturer information, and origin of manufacture and can contain an image 32 of the tagged asset.

The administrative data storage can contain the library of survey set ups 400.

The system can include a plurality of computer instructions stored in the administrative data storage to instruct the administrative processor to perform the following various tasks.

The administrative data storage 14 can include computer instructions 200 to create the customer profile and store the customer profile in the administrative data storage.

The administrative data storage 14 can include computer instructions 202 to create an offshore asset local zone system using the customer provided origin and can store the offshore asset local zone system connected to the customer profile in the administrative data storage enabling a customer to view a graphic image, the tagged assets and the independent survey set ups positioned on the offshore asset in the offshore asset local zone system.

In embodiments, the same computer instructions can access and store information on an already created local grid on the offshore asset for use with the system.

The administrative data storage 14 can include computer instructions 206 to identify placement locations of independent survey set ups in a created offshore asset local zone system of the offshore asset or a local grid of the offshore asset enabling each independent survey set up to monitor tagged assets identified from the library of tagged assets.

The administrative data storage 14 can include computer instructions 214 to present multiple independent survey set ups simultaneously on the executive dashboard and display multiple tagged assets of the offshore asset on the executive dashboard simultaneously.

The administrative data storage 14 can include computer instructions 216 to zoom in and zoom out on an image from one of the independent survey set ups on the executive dashboard when a zoom in button or a zoom out button is actuated.

The administrative data storage 14 can include computer instructions 217 to move through the image from one of the independent survey set ups on the executive dashboard in 360 degrees around an axis of the local coordinate network of assets or the local grid when a rotate button is actuated.

The administrative data storage 14 can include computer instructions 218 to move through the image from an independent survey set up on the executive dashboard in 360 degrees in a horizontal plane of the local coordinate network of assets or the local grid using a left pan button and a right pan button.

The administrative data storage 14 can include computer instructions 219 to move through the image from an independent survey set up on the executive dashboard in 360 degrees in a vertical plane of the local coordinate network of assets or the local grid using an up button and a down button.

The administrative data storage 14 can include computer instructions 220 for installing show hide icons onto an image from an independent survey set up on the executive dashboard when a show hide button is actuated.

The administrative data storage 14 can include computer instructions 222 to add and delete a tagged asset to the library of tagged assets using a client device using a dialog screen to insert or delete: an asset name, an asset geolocation, and asset specifications, when an add or delete button is actuated.

The administrative data storage 14 can include computer instructions 224 to search for a tagged asset from the library of tagged assets using an asset name or an asset geolocation and present the results of the search on the executive dashboard.

The administrative data storage 14 can include computer instructions 226 to add a compass to images from the library of tagged assets for display on the executive dashboard while depicting, the local coordinate network of assets or the local grid, wherein the compass is aligned to a true north relative to the tagged asset on the planet.

The administrative data storage 14 can include computer instructions 228 to present a laser analysis button on the executive dashboard connected to laser analysis software in the administrative data storage.

In an embodiment, the laser analysis button can have an image of a triangle on the button.

The administrative data storage can include laser analysis software 230.

The administrative data storage 14 can include computer instructions 232 to enable a user on a client device to toggle between a full screen and a reduced screen view of a tagged asset, when a full screen/reduced screen toggle button is actuated on the executive dashboard.

The administrative data storage 14 can include computer instructions 236 to enable a user to toggle between a full color image from an independent survey set up and a monochrome image from an independent survey set up when a color/monochrome toggle button is actuated.

The administrative data storage 14 can include computer instructions 240 that supplies location information from a local coordinate network of assets or a local grid of tagged assets and identify at least one geographically proximate independent survey set up location in the local coordinate network of assets or the local grid when an information button is actuated on the executive dashboard.

The administrative data storage 14 can include computer instructions 244 to display a map of the local coordinate network of assets or the local grid while simultaneously viewing images from the independent survey set up when a tab on the executive dashboard is activated.

The administrative data storage 14 can include computer instructions 245 to create a plan view of all or a portion of the independent survey set ups from the library of survey set ups on the executive dashboard.

The administrative data storage can include computer instructions 246 for indicating a direction of a field of reference relative to a north of the offshore asset on the plan view in the offshore asset local zone system or local grid from an independent survey set up using a field of view reference pointer in the plan view created when a tab is actuated on the executive dashboard.

The administrative data storage 14 can include computer instructions 250 to present the plan view simultaneously with the image from one or more operating independent survey set ups using the executive dashboard.

The administrative data storage 14 can include computer instructions 252 creating a library of survey set ups capturing information from each independent survey set up mounted on or proximate to an offshore asset.

The administrative data storage 14 can include computer instructions 254 forming an executive dashboard for displaying the images and data from the independent survey set ups, and from the libraries and transmitting the executive dashboard to a client device of a customer.

FIG. 3 depicts an embodiment of the customer profile 22 usable with the system which can be stored in the administrative data storage 14.

The customer profile 22 can include: a customer name 302; a customer billing address 304; a survey date 306; a customer user identification 308; a customer password 310; a customer security question and an answer 312; an offshore asset name or code 314; global positioning system coordinates for the named or coded offshore asset 316; a customer provided origin 318; a quantity of independent survey set ups on the offshore asset 319; an offshore asset local zone system 320; and a local grid 335.

The offshore asset local zone system can be created by the system for the offshore asset. The offshore asset local zone system can be created to enable a customer to view as a graphic image, the tagged assets and the independent survey set ups positioned on the offshore asset in the offshore asset local zone system.

In embodiments, the customer profile can include the library of tagged assets 322.

The library of tagged assets can include, in embodiments, a plurality of tagged assets 324, an icon 323 for each tagged assets, and a hyperlink 33 connected to (a) each icon 323 and (b) a library of images 30 in the administrative data storage or (c) a library of images in a third party data storage.

In embodiments, the customer profile can contain asset addresses for each asset named using the global positioning system 326, an asset address for each tagged asset as positioned in the offshore asset local zone system or the local grid 328, an asset elevation above a mean sea level 330, an asset location below a mean sea level 332, and an asset description 333.

In embodiments, the customer profile can include pluralities of libraries of tagged assets if the customer has a plurality of offshore assets, that is, one library for each offshore asset.

Figure 4:
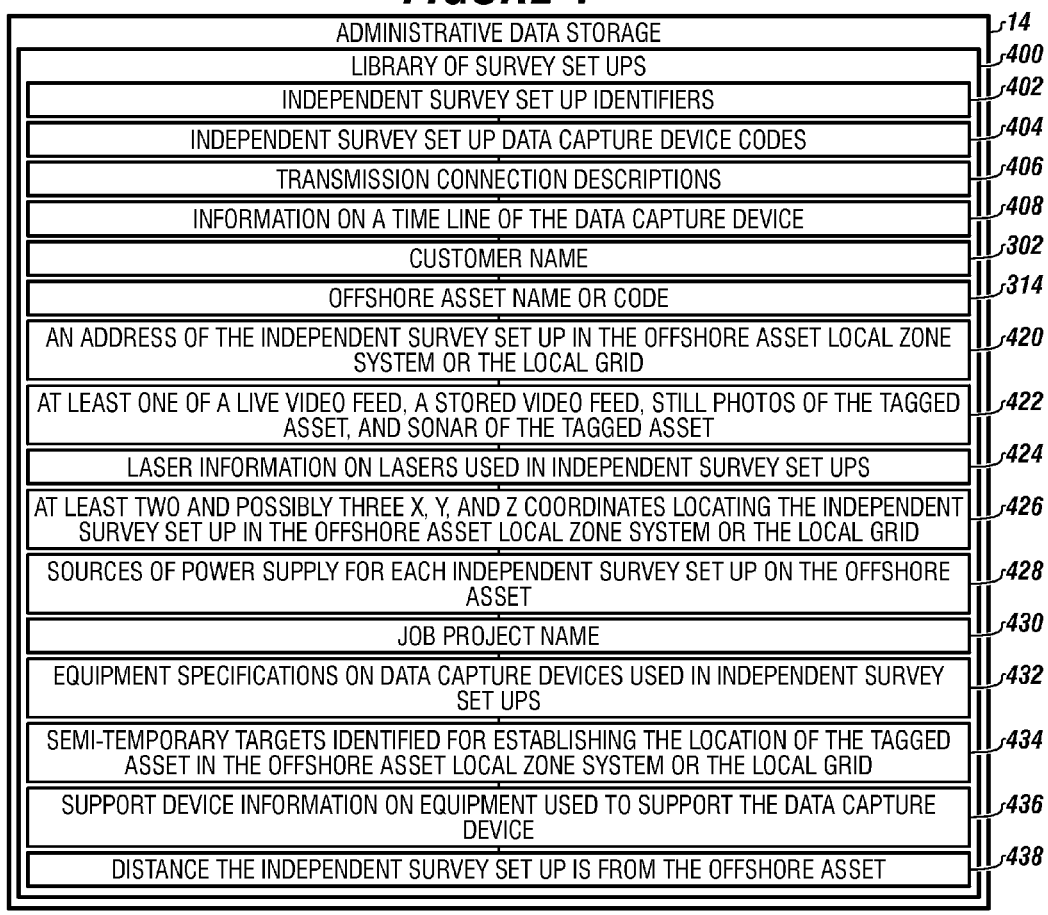
FIG. 4 depicts the fields used to create a library of survey set ups usable with the system.

FIG. 4 depicts the library of survey set ups 400 in the administrative data storage 14 usable with the system.

The library of survey set ups 400 can include (i) an address of the independent survey set up in the offshore asset local zone system or the local grid 420; (ii) at least one of: a live video feed, a stored video feed, still photos of the tagged asset, and sonar of the tagged asset 422; (iii) laser information on lasers used in independent survey set ups 424; (iv) at least two and possibly three x, y, and z coordinates locating the independent survey set up in the offshore asset local zone system or the local grid 426; (v) sources of power supply for each independent survey set up on the offshore asset 428; (vi) transmission connection descriptions 406, which can have an indication of how the digital transfer of data occurs from the independent survey set ups to the administrative data storage; and (vii) a job project name 430.

The library of survey set ups 400 can include at least one of: (i) equipment specifications on data capture devices used in independent survey set ups 432, such as a camera make and model and camera specifications; (ii) semi-temporary targets identified for establishing the location of the tagged asset in the offshore asset local zone system or the local grid 434; (iii) support device information on equipment used to support the data capture device 436; (iv) a distance the independent survey set up is from the offshore asset 438; (v) independent survey set up identifiers 402; (xii) independent survey set up data capture device codes 404; (xiii), information on a time line of the data capture device 408; (xv) a customer name 302 or customer code; (xvi) an offshore asset name or code 314.

The library of survey set ups can include independent survey set up identifiers 402, such as "C1-45" for a set up on a specific corner of level 3 of a drilling rig.

The library of survey set ups can include independent data capture device codes 404, such as a laser scanner coded as "Leica 6200."

The library of survey set ups can include transmission connection descriptions 406 that indicate how the data capture devices can transmit data to the network. For example, a transmission connection description can be use a "jump drive."

For example, the timeline of the data capture device can be a date stamp indicating a month, day, year, and minutes when data capture starts and ends by the data capture device.

Figure 5:
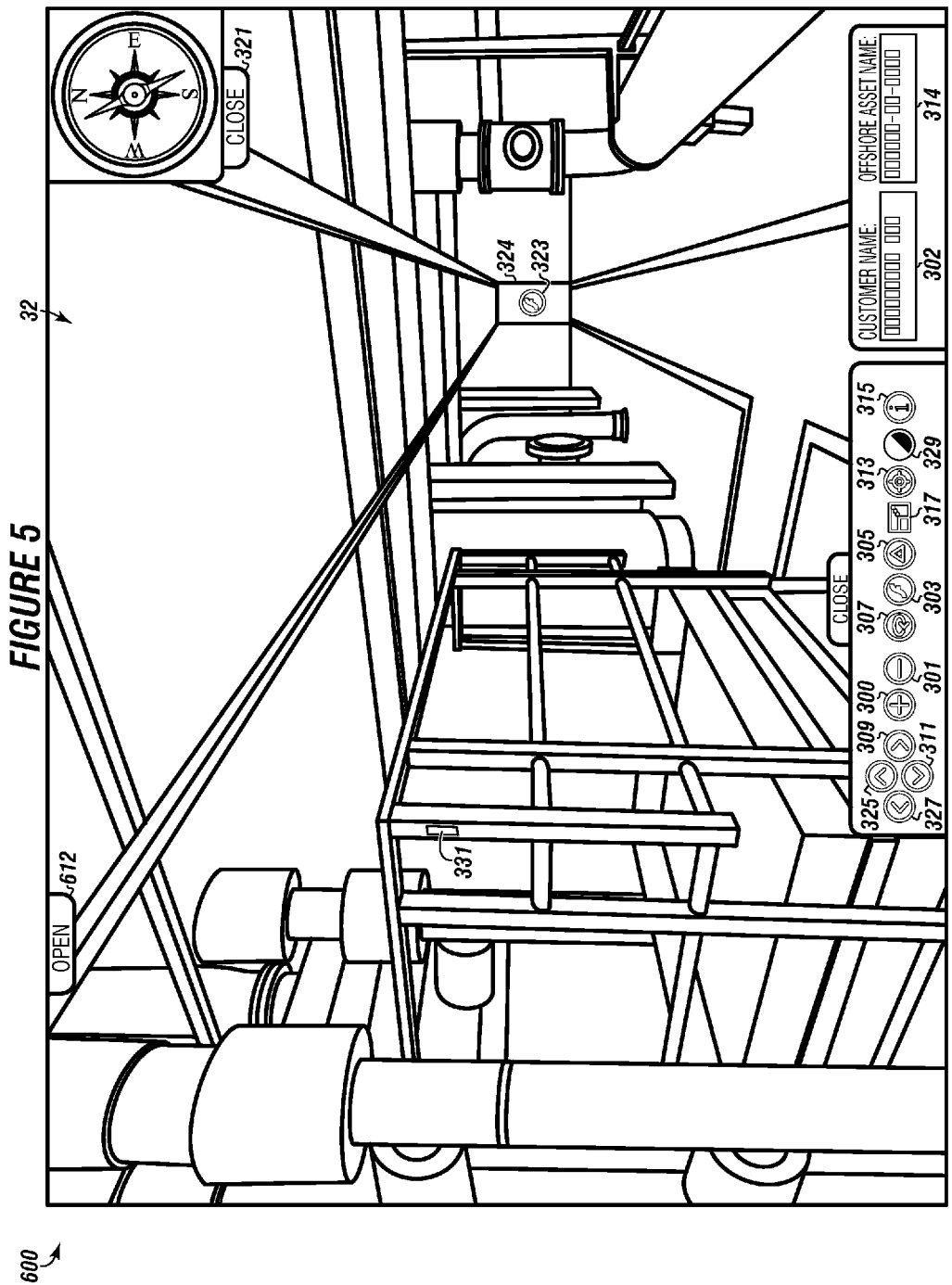
FIG. 5 depicts a display of an executive dashboard produced by this system.

FIG. 5 shows a display of an executive dashboard formed by the system.

The system uses computer instruction in the administrative data storage to instruct the administrative processor to form the executive dashboard 600.

The executive dashboard 600 displays data from (i) each independent survey set up and (ii) the library of survey set ups and may display information from the library of images.

The executive dashboard 600 shows a customer name 302 and an offshore asset name or code 314.

The executive dashboard 600 can be displayed on the client device of the customer, as shown in FIG. 1.

The executive dashboard displays an image 32 of at least one of the plurality of tagged asset 324 and an icon 323 virtually positioned on the tagged asset of the plurality of tagged assets 324.

The virtually positioned icon presents a hyperlink to the library of survey set ups for that tagged asset enabling a customer using the executive dashboard 600 to toggle from the image 32 to the library of survey set ups for each tagged asset being monitored by an independent survey set up.

The executive dashboard 600 can have navigation buttons for use on displayed images from the library of tagged assets, for use on a displayed local coordinate network of assets or combinations thereof.

The executive dashboard can present navigation buttons for displaying on images from the library of tagged assets, the local coordinate network of assets or combinations thereof on the executive dashboard as presented on a client device connected to the network.

The executive dashboard, according to the system, allows a customer to move within the presented image of the tagged asset. The executive dashboard 600 can include a zoom in button 300 and a zoom out button 301, a rotate button 307, and show hide button 303.

A laser analysis button 305 showing a triangle can be presented on the executive dashboard to connect to laser analysis software in the administrative data storage.

The executive dashboard can include a full screen/reduced screen toggle button 317, a left pan button 327 and a right pan button 309. The executive dashboard can include an up button 325 and a down button 311. The executive dashboard can include an add and delete button 313 to add or delete a tagged asset to the library of tagged assets using a client device.

The executive dashboard can include a color/monochrome toggle button 329 that allows a user to toggle between a full color image from the local coordinate network of assets, and a monochrome image from the local coordinate network of assets.

The executive dashboard can include an information button 315 that supplies current location information from a local coordinate network of assets or local grid and identifies at least one geographically proximate independent survey set up location in the local coordinate network of assets.

In this embodiment, a compass 321 is displayed that depicts the orientation of the image from the data capture device to a north relative to the offshore asset local zone system.

A tab 612 on the executive dashboard can activate computer instructions to display a map.

A semi-translucent asset tag 331, which can be generated when an add or delete button is actuated, is also shown. The semi-translucent asset tag can be saved to the library of tagged assets.

FIG. 6 shows that the executive dashboard can additionally display placement locations 680 of a plurality of tagged assets 324a-324f on the offshore asset.

A plan view from a perspective of a plurality of independent survey set up data capture devices each having an icon while data from one specific capture device is simultaneously presented on the executive dashboard.

In embodiments, plan views can drop down and be overlaid onto data capture images when the tab 612 is activated.

A pointer 614 can indicate a direction of a field of reference relative to a north of the offshore asset in the offshore asset local zone system.

FIGS. 7A-7B depict a sequence of steps to implement the system according to one or more embodiments.

In embodiments, steps of the system can be performed by the customer using at least one client device connected to the network and the administrative processor with administrative data storage as described.

The system can include creating a customer profile which is stored in the administrative data storage or in a cloud computing data storage, as shown in step 801.

The customer can create the customer profile as defined herein, using at least one client device connected to the network.

The system can include providing an offshore asset name and offshore asset address for an offshore asset to be surveyed, as shown in step 803.

The system can include identifying a customer provided origin on the offshore asset for surveying, as shown in step 805.

The system can include identifying areas of the offshore asset for monitoring, such as surveying, as shown in step 807.

The system can include using an executive dashboard created using computer instructions in the administrative data storage to request monitoring of identified portions of the offshore asset with the offshore asset address, as shown in step 809.

The system can include requesting creation and installation of independent survey set ups on the offshore asset which target customer identified target assets, as shown in step 810.

The system can include using computer instructions in the administrative data storage to instruct the administrative processor to create an offshore asset local zone system for the identified areas of the offshore asset local zone system or the local grid, as shown in step 811.

The system can include using computer instructions in the administrative data storage to instruct the administrative processor to identify optimum locations to place independent survey set ups with data capture devices oriented at the customer identified tagged assets, as shown in step 812.

The system can include using computer instructions in the administrative data storage to instruct the administrative processor to verify if independent survey set ups are at the optimum locations or if independent survey set ups must be moved to different locations in order to capture more customer identified tagged assets providing a maximum coverage for a customer identified area of an offshore asset, as shown in step 813.

The system can include "turning on", such as powering up, the independent survey set ups to perform data capture of the customer identified tagged assets, as shown in step 814.

The system can include transferring data from operating independent survey set ups to the administrative data storage, as shown in step 815.

The system can include generating a library of survey set ups using information on the independent survey set ups and using computer instructions in the administrative data storage and storing the library of survey set ups in the administrative data storage, as shown in step 816.

The system can include using computer instructions in the administrative data storage to instruct the administrative processor to create a plan view of all or a portion of the independent survey set ups from the library of survey set ups can be created, as shown in step 817.

The system can include using computer instructions in the administrative data storage to instruct the administrative processor to enable a plan view to be viewed simultaneously with the data from one or more operating independent survey set ups using the executive dashboard, as shown in step 818.

The system can include using computer instructions in the administrative data storage to instruct the administrative processor to form a library of tagged assets for the specific offshore asset being surveyed with the independent set ups, as shown in step 820.

The system can include creating an icon connected to the library of tagged assets and installing the icon virtually over the image of the tagged asset generated from the data capture device, which can also include creating a hyperlink for the icon to the library of images and the customer profile in the administrative data storage, as shown in step 821.

In embodiments, creation of the icon includes creating a hyperlink for the icon to the library of images and the customer profile in the administrative data storage. In embodiments, the library of images can be in the third party data storage.

By linking the library of tagged assets to the library of survey set ups, the tagged assets can be monitored simultaneously with a plan view map using locations indicated in the offshore asset local zone system displayed on the executive dashboard.

The customer can now make decisions in real time on repair, maintenance, safety, and asset inventory control with this system, using at least one of the client devices of the customer, all of which can be remote from the offshore asset, or using at least one of the client devices that is on or adjacent to the offshore asset.

The system can include using computer instructions and the executive dashboard to access and view related data of the offshore asset such as tagged asset specification data, while viewing the data capture images and the plan view simultaneously from a plurality of client devices of the customer, simultaneously, as shown in step 824.

By means of the system for monitoring a plurality of tagged assets, the client device can tour any offshore asset with real time visualisation, accurate real world on screen measurements, using laser analysis software, and view/download all deliverables such as drawings, 3D models, photos and reports through a library of images. All information can be derived from the latest data capture devices, allowing real time monitoring from remote locations by one or more users, providing ultimate confidence. A library of tagged assets can be incorporated into the ISITE™ system created by UTEC Survey, Inc. of Houston, Tex., intelligently linking, via a world area network, private network, third party cloud network, or any various combinations thereof.

Visualisation tools designed to revolutionize and consolidate asset management operations which are proven to increase productivity and reduce operational expenditures, while minimising accidents, environmental harm and injuries by visualising and identifying hazards in advance of work being carried out on the offshore asset.

While these embodiments have been described with emphasis on the embodiments, it should be understood that within the scope of the appended claims, the embodiments might be practiced other than as specifically described herein.

What is claimed is:

1. A system for monitoring a plurality of tagged assets on at least one of a plurality of offshore assets, the system comprising:
   a. an administrative processor connected to an administrative data storage, wherein the administrative processor is connected to a network;
   b. a plurality of independent survey set ups connected to the network, with each of the plurality of independent survey set ups directed to a tagged asset, each of the plurality of independent survey set ups having at least one data capture device, wherein each of the plurality of independent survey set ups comprising a survey set up processor connected to a survey set up data storage configured to provide temporary or portable memory storage of images from the at least one data capture device, and wherein the at least one data capture device is a camera and at least one of: a laser survey instrument, a portable laser scanner, and a sonar device;
   c. a global positioning system differential receiver/transmitter that connects to a local grid for at least one of the plurality of offshore assets;
   d. computer instructions in the administrative data storage to instruct the administrative processor to create a customer profile and store the customer profile in the administrative data storage;
   e. a customer provided origin stored in the customer profile;
   f. computer instructions in the administrative data storage to instruct the administrative processor to form a library of tagged assets for an offshore asset monitored using the plurality of independent survey set ups, wherein a library of tagged assets in the customer profile comprising a plurality of tagged assets, each tagged asset having an icon with a hyperlink to a library of images in the administrative data storage or to a library of images in a third party data storage;
   g. computer instructions in the administrative data storage to instruct the administrative processor to create a library of survey set ups capturing information from each of the plurality of independent survey set ups mounted on or proximate to the offshore asset;
   h. computer instructions in the administrative data storage to instruct the administrative processor to identify placement locations of each of the plurality of independent survey set ups in a created offshore asset local zone system or the local grid of the offshore asset enabling each of the plurality of independent survey set ups to monitor tagged assets identified from the library of tagged assets; and
   i. computer instructions in the administrative data storage to instruct the administrative processor to form an executive dashboard for display on at least one client device of a customer, wherein the executive dashboard receives from (i) each of the plurality of independent survey set ups and (ii) the library of survey set ups and displaying (a) a customer name or (b) an offshore asset name or code; wherein the executive dashboard displays an image of each of the tagged assets of the plurality of tagged assets and a virtually positioned icon on the tagged asset, wherein the virtually positioned icon presents a hyperlink to the library of survey set ups for that tagged asset enabling the customer using the executive dashboard to toggle from the images to the library of survey set ups for each tagged asset being monitored by each of the plurality of independent survey set ups; and wherein the executive dashboard displays placement locations of the plurality of tagged assets on the offshore asset.

2. The system of claim 1, comprising a third party processor connected to the third party data storage, wherein the third party processor is connected to the network containing a library of images which can be accessed by the administrative processor for use in the system.

3. The system of claim 1, further comprising computer instructions in the administrative data storage to instruct the administrative processor to:
   a. create the offshore asset local zone system using the customer provided origin; and
   b. storing the offshore asset local zone system connected to the customer profile in the administrative data storage enabling the customer to view as a graphic image, the tagged assets and each of the plurality of independent survey set ups positioned on the offshore asset in the offshore asset local zone system.

4. The system of claim 1, comprising computer instructions in the administrative data storage to instruct the administrative processor to present the plurality of independent survey set ups simultaneously on the executive dashboard and display multiple tagged assets of the offshore asset on the executive dashboard simultaneously.

5. The system of claim 1, comprising computer instructions in the administrative data storage to instruct the administrative processor to zoom in and zoom out on the images from the plurality of independent survey set ups on the executive dashboard when a zoom in button or a zoom out button is actuated.

6. The system of claim 1, comprising computer instructions in the administrative data storage to instruct the administrative processor to move through the images from the plurality of independent survey set ups on the executive dashboard in 360 degrees around an axis of a local coordinate network of assets or the local grid when a rotate button is actuated.

7. The system of claim 1, comprising computer instructions in the administrative data storage to instruct the administrative processor to move through the images from the plurality of independent survey set ups on the executive dashboard in 360 degrees in a horizontal plane of a local coordinate network of assets or the local grid using a left pan button and a right pan button.

8. The system of claim 1, comprising computer instructions in the administrative data storage to instruct the administrative processor to move through the images from the plurality of independent survey set ups on the executive dashboard in 360 degrees in a vertical plane of a local coordinate network of assets or the local grid using an up button and a down button.

9. The system of claim 1, comprising computer instructions in the administrative data storage to instruct the administrative processor for installing show hide icons onto the images from the plurality of independent survey set ups on the executive dashboard when a show hide button is actuated.

10. The system of claim 1, comprising computer instructions in the administrative data storage to instruct the administrative processor to add and delete a tagged asset to the library of tagged assets using the at least one client device using a dialog screen to insert or delete: an asset name, an asset geolocation, and asset specifications when an add or delete button is actuated on the executive dashboard.

11. The system of claim 1, comprising computer instruction instructions in the administrative data storage to instruct the administrative processor to search for the tagged asset from the library of tagged assets using an asset name or an asset geolocation and presents the results of the search on the executive dashboard.

12. The system of claim 1, comprising computer instructions in the administrative data storage to instruct the administrative processor to add a compass to images from the library of tagged assets for display on the executive dashboard, while depicting a local coordinate network of assets or the local grid, and wherein the compass is aligned to a true north relative the tagged asset on the planet.

13. The system of claim 1, comprising computer instructions in the administrative data storage to instruct the administrative processor to present a laser analysis button on the executive dashboard connected to laser analysis software in the administrative data storage.

14. The system of claim 1, comprising computer instructions in the administrative data storage to instruct the administrative processor to enable the customer on the at least one client device to toggle between a full screen and a reduced screen view of the tagged asset when a full screen/reduced screen toggle button is actuated on the executive dashboard.

15. The system of claim 1, comprising computer instructions in the administrative data storage to instruct the administrative processor to enable the customer to toggle between a full color image and a monochrome image from the plurality of independent survey set ups when a color/monochrome toggle button is actuated on the executive dashboard.

16. The system of claim 1, comprising computer instructions in the administrative data storage that supplies location information from a local coordinate network of assets or the local grid of tagged assets and identifies at least one geographically proximate independent survey set up location in the local coordinate network of assets or the local grid when an information button is actuated on the executive dashboard.

17. The system of claim 1, comprising computer instructions in the administrative data storage to instruct the administrative processor to display a map of a local coordinate network of assets or the local grid while simultaneously viewing images from the plurality of independent survey set ups when a tab on the executive dashboard is activated.

18. The system of claim 1, comprising computer instructions in the administrative data storage to instruct the administrative processor to create a plan view of all or a portion of the plurality of independent survey set ups from the library of survey set ups on the executive dashboard.

19. The system of claim 18, comprising computer instructions in the administrative data storage for indicating a direction of a field of reference relative to a north of the offshore asset in the offshore asset local zone system or the local grid from one or more operating independent survey set ups using a field of view reference pointer in the plan view created when a tab is actuated on the executive dashboard.

20. The system of claim 19, comprising computer instructions in the administrative data storage to instruct the administrative processor to present the plan view simultaneously with the images from the one or more operating independent survey set ups using the executive dashboard.

21. The system of claim 1, wherein the library of survey set ups includes (i) an address of the plurality of independent survey set ups in the offshore asset local zone system or the local grid; (ii) at least one of a live video feed, a stored video feed, still photos of the tagged asset, and sonar of the tagged asset; (iii) laser information on lasers used in the plurality of independent survey set ups; (iv) at least two coordinates locating the plurality of independent survey set ups in the offshore asset local zone system or the local grid, (v) sources of power supply for the plurality of independent survey set ups on the offshore asset; (vi) transmission connection descriptions of how the digital transfer of data occurs from the plurality of independent survey set ups to the administrative data storage; and (vii) a job project name.

22. The system of claim 21, wherein the library of survey set ups includes at least one of: (i) equipment specifications on data capture devices used in the plurality of independent survey set ups; (ii) semi-temporary targets identified for establishing the location of the tagged asset in the offshore asset local zone system or the local grid; (iii) support device information on equipment used to support the data capture device; (iv) a distance the plurality of independent survey set ups is from the offshore asset; (v) survey set up identifiers; (vi) independent survey set up data capture device codes, (vii) information on a time line of the at least one data capture device; (viii) a customer name or a customer code, and (ix) an offshore asset name or an offshore asset code.

* * * * *